UNITED STATES PATENT OFFICE.

THOMAS S. BLAIR, OF PITTSBURG, PENNSYLVANIA.

IMPROVEMENT IN IRON SPONGE.

Specification forming part of Letters Patent No. 126,924, dated May 21, 1872.

*To all whom it may concern:*

Be it known that I, THOMAS S. BLAIR, of Pittsburg, in the county of Allegheny and State of Pennsylvania, have invented a new and Improved Metallic Iron Sponge, manufactured from the oxides of iron by deoxidation; and I do hereby declare that the following is a full, clear, and exact description of the process which I employ in such manufacture of iron sponge, which will enable others skilled in the art of manufacturing iron to produce my improved iron sponge as an article of manufacture.

Oxygen, combined with iron, in the form of the oxides of that metal, can be dissociated from it by subjecting the oxide, in contact with solid carbon for a certain time, to a uniform red heat, the access of other oxygen during the process being carefully prevented. By this means the oxygen leaves the iron and unites with the carbon, passing off in a gaseous state, while the iron remains, being reduced to a metallic state as iron sponge. The metallic iron thus obtained is, however, in a very sensitive condition while hot, and in that state absorbs oxygen with great avidity, but, if cooled before being brought into contact with the atmosphere, it does not readily reoxidize.

The theory of the production of metallic iron from its oxides by reduction in the manner above described is extremely simple, but its realization in practice, so as to produce true iron sponge on a commercial scale, or otherwise than as a laboratory experiment, has hitherto baffled every effort, so that there is not at the present day any establishment which makes use of this form of iron for any purpose, unless it be in the case of bloomeries, where, in a few instances only, an extremely imperfect article of partially-deoxidized ore is employed as a sort of intermediate process between the treatment of raw ore and that of pig-iron.

The chief causes of failure in all previous attempts to produce iron sponge I believe to be, first, the want of sufficient conduction of heat through a medium so ill adapted to the purpose as are the materials to be treated, which results in a very irregular and imperfect reduction of the mass; and, second, the imperfect exclusion of the atmospheric air from the metallic iron before it is sufficiently cool to resist the tendency to reoxidation. Air is so mobile and searching a fluid that no devices of valves, traps, &c., have been found efficient for this purpose.

Attempts have been made to reduce the oxides of iron to a metallic condition, and remove the resulting product from the apparatus while it is yet hot, but this must necessarily effect the reoxidation of the surface, at least, of the mass, and destroy its character as true iron sponge.

The iron sponge which I manufacture is the product obtained by treating oxides of iron in contact with carbon at a suitable heat, and with practically-complete isolation from the atmosphere, in the manner hereinafter described. After reduction, the product—iron sponge—retains the general contour or shape of the ore or cinder from which it is derived, but somewhat expanded in bulk, and with very marked loss of weight. It has a very open or spongy texture; is readily sectile; is easily indented by the finger-nail; chews like lead between the teeth, and polishes quickly to a silvery luster. Its color, unless influenced by some coloring matter accidentally present in the ore, is grayish, varying from blackish to a clear lead color. Such is the color of the sponge made from the black magnetic ores of the Champlain region, the compact red hematites of Lake Superior and Missouri, and from the hydrated peroxides (brown hematites) generally; and also from artificial oxides, such as "tap-cinder" of the puddling process. Another characteristic of my sponge is, that when powdered and burned in the open air, it sparkles brilliantly, as does iron burned in an atmosphere of oxygen. This sponge consists of the non-volatile matter of the raw ore or cinder—that is, the matter not capable of volatilization, either by the degree of heat employed, or by contact with carbon. The peculiar spongy texture of this product, due to its state of minute subdivision and exposure, whereby it is rendered extremely sensitive to chemical action, is caused by the loss of the volatile matter, which, separating from the ore, leaves minute cells and spaces throughout its entire mass. Hence the great practical difficulty of securing and retaining the iron sponge in its metallic state.

I will now proceed to describe the process by which I obtain my new product of iron sponge.

The apparatus which I employ is particularly described in the specification and drawings of an application for Letters Patent for improvement in the manufacture of metallic iron from the oxides of that metal, filed simultaneously herewith, and to which I refer for the details of its construction. It consists, substantially, of one or more vertical chambers, constructed of fire-brick or other suitable material, cylindrical in shape, of about three feet diameter, and about thirty feet in height. These cylinders or retorts are, for about two-thirds of their length from the top downward, inclosed in a heating-chamber, supplied with heat from any suitable furnace. The cylindrical retorts are open at top outside of the heating-chamber, but have no openings communicating with the interior of the heating-chamber, nor with the external air, excepting at their upper and lower extremities. The furnace is supplied with spy-holes, closed with stoppers, through which holes the workmen can carefully observe the degree of heat, which it is important to regulate to an uniform and suitable temperature, as hereinafter stated. Below the heating-chamber the retorts are, for about one-third of the remaining length, closely surrounded by brick-work, and below the brick-work the cylindrical retorts are continued of uniform diameter, of wrought-iron, and surrounded with a tank provided with a running stream of cold water, which, however, has no access to the interior of the cylinders. The bottom of each cylinder, below the cold-water tank, is closed by a sliding table, fitting closely to the lower extremity of the iron cylinder, in which table are one or more pots or vessels adapted to receive and convey away a certain portion of the material from the lower end of the iron cylinder, so that, by sliding the table forward, the contents of the pot are sheared off without any exposure of the contents of the retort to access of atmospheric air. The diameter of these cylindrical retorts may be varied, but if over six inches, I provide at top of each retort a conductor or conductors, inserted into the top of the retort, through which the materials are introduced. When the retorts are of the dimensions before stated, say thirty-six inches, I prefer to form the conductor by inserting in the top of the retort a pipe of fire-clay, so as to give an annular space around it, through which space (and not into the interior of the pipe) I charge the materials to be treated, and, by keeping the retorts always full up to the top around the pipe just named, every particle of the material under treatment is, at the commencement of the operation, within short distance of the heat, and thus becomes uniformly and thoroughly heated before entering that part of the retort into which the conductor-pipe does not extend. In a retort of thirty feet in length these pipes should be about six feet in length.

Apart from the arrangements above specified, whereby the retort is kept hot above and cool below, it will be seen that my apparatus is essentially a pipe with a device at top for heating the contents as they enter, and another below for preventing or reducing to a minimum the ingress of air when withdrawing the material. The former removes the difficulty of conducting the heat through the materials to be treated, while the latter is an auxiliary to the necessary condition of exclusion of air from the material while sensitive; but the main dependence for securing this non-access of air, to which I attribute, in great measure, my success in producing true metallic sponge, is the employment of the material itself as a packing, whereby to exclude the air. This I accomplish, first, by giving sufficient length of pipe or retort to secure the requisite depth of material both above and below the zone of reducing action; second, by providing that the oxide or carbon, or both, shall be in particles fine enough to constitute a good packing; third, by keeping the retort constantly filled.

From the above description of my apparatus the operation will be readily understood. The carbon and oxide are first mixed together; then charged into the top of the retort around the pipe, or into the conductor, as the case may be. The heat in the heating-chamber surrounding the retort above the cooling-zone is kept constantly at the required temperature, the water in the tank below kept constantly cool by fresh supply, and the drawing below regulated so as to give the material under treatment whatever duration of exposure it may require.

There are, however, several details, which I have learned by experience, of the practical working of the process which are important to be known and observed, and which I will now proceed to specify.

In selecting and preparing the materials the quantity of carbon theoretically necessary is three-fourths, by weight, of the quantity of oxygen present in the oxide; but as perfect uniformity of distribution and contact cannot be practically attained, an excess (say, ten per cent.) of carbon should be added. The carbon to be mixed with the ore may be charcoal, coke, or anthracite coal. If coke is used, that made from washed coal is best, as being freer from sulphur. Bituminous coals do not answer well, as they coke and thereby disturb the regular downward flow of the material in the retort. They are also objectionable because the hydrogen evolved tends to promote the carburization of the iron sponge. The fineness of the carbon and ore makes, I find, little difference, excepting that the larger pieces of ore take a little longer time to reduce. It is therefore found desirable to classify the ore by screening or otherwise, according to size, and in making up a charge to use ore of uniform size. It is, however, desirable that the average relative size of the lumps of carbon and ore should differ, one being larger than the other, as I find by experience that the mixed material descends more freely in the retort when this is the case.

The materials being properly selected and mixed, care should be taken to keep the retorts constantly filled to the top, which will prevent the ingress of air at the top of the retorts, which are not otherwise closed.

As before stated, the heat may be generated in any suitable furnace adjacent to or, if preferred, within the heating-chamber. It is, however, important that the furnace should be so constructed and arranged as to maintain an equable temperature. The proper degree of heat may be ascertained by the color, which should not exceed a fair red, tending to yellow, as at a white heat the sponge becomes sticky, which impedes its regular descent in the retort, and takes up carbon rapidly, thus becoming a mass of irregularly-converted steel. On the other hand, too low a heat retards the process and diminishes the product. These matters being attended to, the desired result may be depended upon as certain.

It is only necessary, further, to withdraw the finished sponge at proper intervals of time, which will vary according to the kind of ore under treatment, and which can be readily ascertained by examining the product occasionally. If the sponge withdrawn from the bottom of the retort, as before described, has the qualities before described as the characteristics of my iron sponge, it has been properly reduced; but if it is so soft that it can be easily pressed flat between the finger and thumb, it has been exposed to treatment too long; but if, on the other hand, it cannot be readily sliced with a knife it has not been treated long enough, and the interval between the drawings should be increased. So soon as the proper interval between the drawings has been ascertained for any particular kind of ore there will be little or no trouble in keeping the reduction to the right point.

If any portion of the sponge, when withdrawn from the apparatus, should show, instead of its characteristic color, a steely-blue tinge or a straw color, it is a certain indication that the apparatus is defective and is leaking air into it. If this arises from a defective fitting of the face of the sliding table to the lower end of the iron pipe or cylinder at the bottom of the retort, it may be cured by luting around that point with clay after each drawing.

If for any reason it is desired to withdraw any of the sponge from the retort before it is cold, or at a red heat even, it may be effected by throwing fine dust of charcoal or coke upon the face of the vessel as it slides from under the retort. If done quickly and in sufficient quantity but little of the sponge will be injured.

Ordinarily the sponge will be withdrawn from the retort cold, or so nearly so as not to be affected by contact with the atmosphere. It will be found to contain particles of solid carbon, which can be separated almost entirely by simple screening, if care has been taken, as before recommended, to have either one of them coarser than the other. If the sponge is to be used for making steel, or for other purposes for which the presence of carbon in uncertain quantities is undesirable, it may be separated by magnetism, or by simple washing.

The iron sponge thus obtained may be used in manufacture of wrought-iron or steel, as described in another specification prepared by me, or for many other purposes in which finely-divided metallic iron is employed.

Having thus described the process by which I manufacture my iron sponge, what I claim as my invention, and desire to secure by Letters Patent, is—

Metallic iron sponge, manufactured substantially as hereinbefore described, as a new article of manufacture.

In testimony whereof I have hereunto set my hand.

THO. S. BLAIR.

Witnesses:
 CHAS. CONS. CALLAN,
 W. BAKEWELL.